E. E. PHINNEY.
MEANS TO PREVENT REVERSE MOVEMENT IN CALCULATING MACHINES.
APPLICATION FILED AUG. 27, 1915.
1,215,187.
Patented Feb. 6, 1917.
2 SHEETS—SHEET 1.
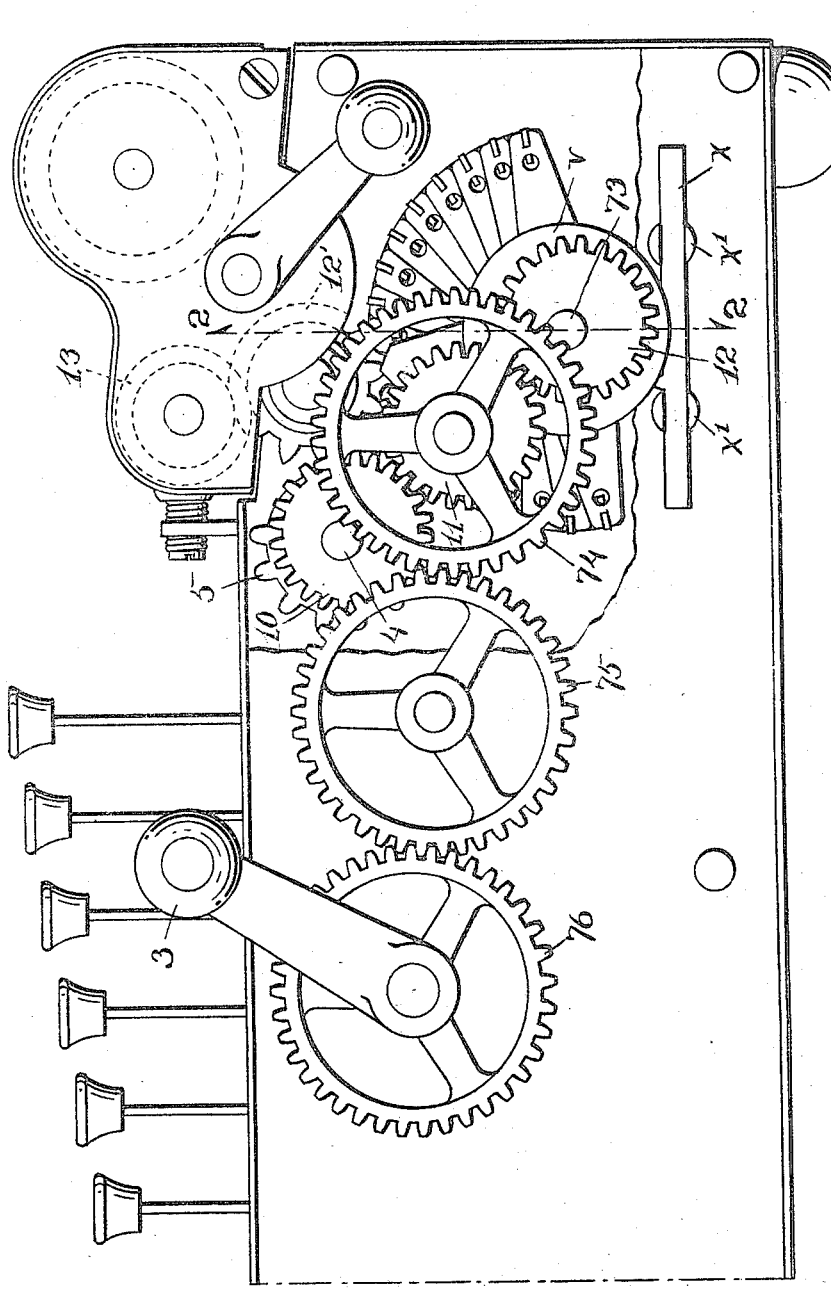

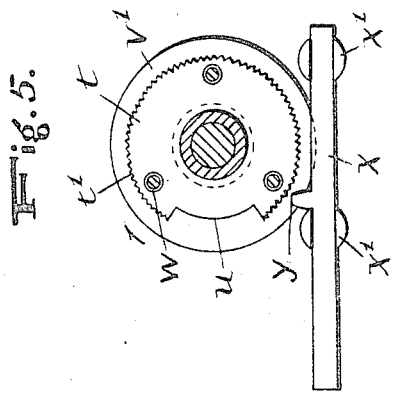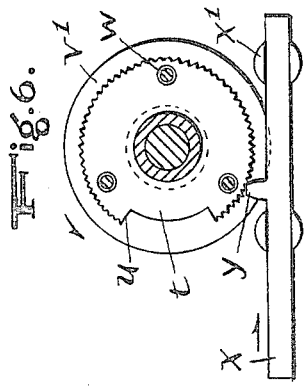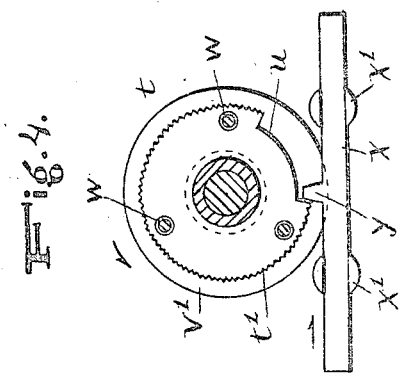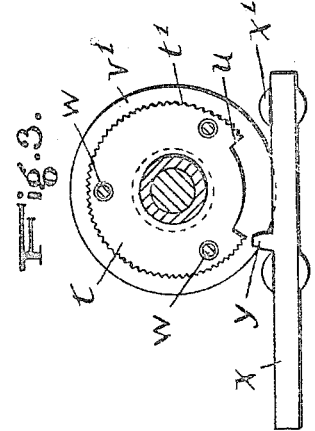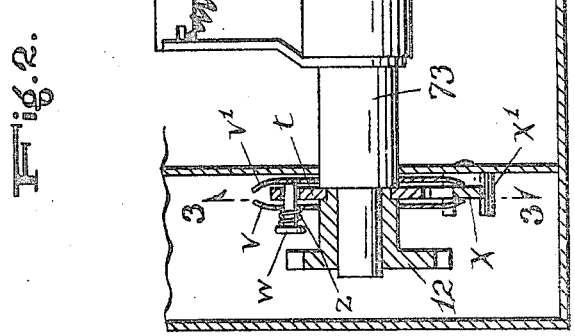

UNITED STATES PATENT OFFICE.

EDGAR E. PHINNEY, OF NEW YORK, N. Y., ASSIGNOR TO MONROE CALCULATING MACHINE COMPANY, OF NEW YORK, N. Y., A CORPORATION OF NEW YORK.

MEANS TO PREVENT REVERSE MOVEMENT IN CALCULATING-MACHINES.

1,215,187.  Specification of Letters Patent.  Patented Feb. 6, 1917.

Application filed August 27, 1915. Serial No. 47,645.

*To all whom it may concern:*

Be it known that I, EDGAR E. PHINNEY, a citizen of the United States, resident of New York, in the county of New York and State of New York, have made a certain new and useful Invention in Means to Prevent Reverse Movement in Calculating-Machines; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a side view of a calculating machine partly broken away and showing the invention as applied.

Fig. 2 is a section on the line 2—2, Fig. 1, with parts broken away.

Fig. 3 is a section on the line 3—3, Fig. 2, with parts removed, the check wheel and sliding bar being in normal position.

Fig. 4 is a similar view, with the check wheel partly rotated, and the tooth of the sliding bar in the position taken in passing through the notch of said wheel.

Fig. 5 is a similar view with the check wheel rotated ninety degrees in one direction and the tooth of the sliding bar in the position taken throughout the rotation of said wheel.

Fig. 6 is a similar view with the tooth of the sliding bar in the position taken when reverse movement of the check wheel is attempted.

The invention has relation to means to prevent reverse movement of a rotary element until the complete rotation thereof, in either direction, has been effected, being primarily designed for use with calculating machines, to prevent reverse movement of the operating handle, of the primary or differential actuating wheels and of certain of the carrying devices, as shown and described in my co-pending application for patent, Serial Number 41,343, the principal objects of the invention being to provide an efficient device for the purpose, that will eliminate all clicking or noise.

The invention consists in the novel construction and combinations of parts, as hereinafter set forth.

In the accompanying drawings, illustrating the invention, the numeral 3 designates the operating or crank handle, 4 the shaft of the selecting wheels, 5 the selecting wheels, 13 the registering wheels, 12' the intermediate gears, 73 the shaft of the carrying mechanism and 74, 75, 76, 10, 11 and 12 a train of gears for turning the selecting wheels and the shaft of the carrying mechanism, upon operation of the crank handle.

The crank handle is turned completely in one direction, or clockwise, for addition and multiplication, and completely in the opposite direction for subtraction and division, each time from the same starting point, and the invention is designed to prevent reverse movement until the complete rotation, in either direction, has been brought about.

Located preferably upon the shaft 73 of the carrying mechanism, is a check wheel $t$, having a toothed peripheral edge $t'$, and a peripheral notch $u$, friction plates $v, v'$, being located one at each side of the check wheel, pins $w, w$, connecting said plates and said wheel, and coiled springs surrounding said pins and acting to press said plates together.

$x$ is a sliding bar, working in guide studs $x'$, and having a tooth $y$, normally out of engagement with the teeth of the check wheel, the springs $z$, of the pins $w, w$, pressing the friction plates against the sides of said bar, in such wise that when the check wheel and the friction plates are turned the check bar will be given a sliding movement. In this way, as the shaft of the carrying mechanism is turned, through its driving connection with the crank handle, the check wheel and friction plates are turned therewith and the bar controlled as stated, the tooth thereof being brought into locking engagement with the teeth of said wheel, to prevent any effective movement of reversal in case this is attempted before the rotation is completed.

The rotation of the shaft 73 and of the check wheel being completed, the peripheral notch of the check wheel is brought around to the position shown in Fig. 3, immediately adjacent to the tooth of the check bar, and, upon reverse movement of the shaft 73 and of the check wheel, the position of said notch admits of the passage of said tooth, in the movement of said bar, to the opposite side of the check wheel, or until the tooth has just passed out of the notch, when a suitable stop, as engagement of the tooth itself with the guide stud $x'$, will hold the tooth close to the toothed edge of the check wheel, ready for instant engagement with said wheel, should reversal be attempted. And inasmuch as there is normally no contact between the teeth of the check wheel and the tooth of the bar, there will be no clicking or other noise in the operation, the movement of the friction plates upon the check bar being not noticeable.

If the check wheel is given a clockwise direction of rotation, the check bar is carried to the position shown in Fig. 5. If the direction of the movement be now reversed, the friction plates will carry the tooth of the check bar against the teeth of the check wheel and lock the machine, forcing the operator to complete the rotation in a clockwise direction. From the normal position, with the tooth of the check bar out of engagement with the teeth of the check wheel, and the peripheral notch of said wheel in position admitting of passage of the said tooth through the notch, the parts may be operated in either direction, the check bar acting automatically, as described, to prevent the reversal until the required rotation has been completed.

I claim:

1. Means to prevent reverse movement of a rotary member, including a rotary element, reciprocatory locking means, and friction means for bringing said locking means into engagement with said element upon reverse movement of said member.

2. Means to prevent reverse movement of a rotary member, including a rotary element, reciprocatory locking means normally out of engagement with said element, and friction means for bringing said locking means into engagement with said element upon reverse movement of said member.

3. Means to prevent reverse movement of a rotary member, including a rotary toothed element, reciprocatory toothed locking means, and friction means for bringing said locking means into engagement with said element upon reverse movement of said member.

4. Means to prevent reverse movement of a rotary member, including a rotary toothed element, reciprocatory toothed locking means normally out of engagement with said rotary element, and friction means for bringing said locking means into engagement with said element upon reverse movement of said member, in either direction.

5. Means to prevent reverse movement of a rotary member, including a rotary toothed wheel, a toothed slide normally out of engagement with said wheel, and friction means for moving said slide to bring the tooth thereof into locking engagement with said wheel upon reverse movement of said member, in either direction.

6. Means to prevent reverse movement of a rotary member, including a rotary toothed wheel, a slide having a tooth normally out of engagement with said wheel, and friction plates fast with said wheel for moving said slide to bring the tooth thereof into locking engagement with said wheel upon reverse movement of said member, in either direction.

7. Means to prevent reverse movement of a rotary member, including a rotary toothed wheel having a notch, a slide having a tooth normally out of engagement with said wheel and adapted to pass through said notch, and friction plates fast with said wheel and engaging said slide to bring the tooth thereof into locking engagement with said wheel upon reverse movement of said member, in either direction.

8. Means to prevent reverse movement of a rotary member, including a rotary toothed wheel having a notch, a slide having a tooth normally out of engagement with said wheel and adapted to pass through said notch, friction plates at the sides of said wheel, pins connecting said wheel and said plates, and coiled springs upon said pins to press said plates together, said plates engaging said slide to bring the tooth thereof into locking engagement with said wheel upon reverse movement of said member, in either direction.

In testimony whereof I affix my signature, in presence of two witnesses.

EDGAR E. PHINNEY.

Witnesses:
Chas. M. Close,
C. F. Williams.